(12) United States Patent
Hosokawa et al.

(10) Patent No.: US 10,563,124 B2
(45) Date of Patent: Feb. 18, 2020

(54) METHOD OF PRODUCING NITRIDE FLUORESCENT MATERIAL (71) Applicant: NICHIA CORPORATION, Anan-shi, Tokushima (JP)

(72) Inventors: Shoji Hosokawa, Tokushima (JP); Daiki Kuramoto, Anan (JP)

(73) Assignee: NICHIA CORPORATION, Anan-shi (JP)

( * ) Notice: Subject to any disclaimer, the term of this patent is extended or adjusted under 35 U.S.C. 154(b) by 295 days.

(21) Appl. No.: 15/635,751

(22) Filed: Jun. 28, 2017

(65) Prior Publication Data
US 2018/0002600 A1 Jan. 4, 2018

(30) Foreign Application Priority Data

Jun. 30, 2016 (JP) ................. 2016-130244

(51) Int. Cl.
C09K 11/77 (2006.01)
C09K 11/08 (2006.01)

(52) U.S. Cl.
CPC ...... C09K 11/7734 (2013.01); C09K 11/0883 (2013.01)

(58) Field of Classification Search
CPC .................................................. C09K 11/7734
See application file for complete search history.

(56) References Cited

U.S. PATENT DOCUMENTS

| 8,513,876 B2 * | 8/2013 | Shioi ................ C04B 35/597 313/503 |
| 2005/0040765 A1 | 2/2005 | Okumura et al. |
| 2005/0277570 A1 | 12/2005 | Zukawa et al. |
| 2007/0232181 A1 | 10/2007 | Okumura et al. |
| 2009/0021141 A1 | 1/2009 | Emoto et al. |
| 2010/0200874 A1 | 8/2010 | Shioi et al. |
| 2012/0228550 A1 * | 9/2012 | Won ................ C09K 11/0883 252/301.4 H |
| 2013/0154141 A1 | 6/2013 | Shioi et al. |
| 2014/0284649 A1 | 9/2014 | Baumgartner et al. |
| 2015/0123155 A1 | 5/2015 | Schmidt et al. |
| 2016/0060518 A1 | 3/2016 | Hirosaki et al. |

FOREIGN PATENT DOCUMENTS

| EP | 2163595 A1 | 3/2010 |
| EP | 2940099 A1 | 11/2015 |
| JP | S52151555 A | 12/1977 |
| JP | H06299147 A | 10/1994 |
| JP | H10259374 A | 9/1998 |
| JP | 2002069442 A | 3/2002 |
| JP | 2003-515655 A | 5/2003 |
| JP | 2005100954 A | 4/2005 |
| JP | 2009-132916 A | 6/2009 |
| JP | 2009286995 A | 12/2009 |
| JP | 2009293035 A | 12/2009 |
| JP | 2012077182 A | 4/2012 |
| JP | 2012079883 A | 4/2012 |
| JP | 2013-173806 A | 9/2013 |
| JP | 2014529912 A | 11/2014 |
| JP | 2015-224339 A | 12/2015 |
| WO | 2004031323 A1 | 4/2004 |
| WO | 2010-143590 A1 | 12/2010 |
| WO | 2011149156 A1 | 12/2011 |
| WO | 2012-033013 A1 | 3/2012 |
| WO | 2014175385 A1 | 10/2014 |

OTHER PUBLICATIONS

European Patent Office, Extended European Search Report in EP application No. 17178119 dated Dec. 13, 2017, 5 pages.

* cited by examiner

Primary Examiner — C Melissa Koslow
(74) Attorney, Agent, or Firm — Hunton Andrews Kurth LLP (57) ABSTRACT A method of producing a nitride fluorescent material having relatively high light emission intensity is provided. The method of producing a nitride fluorescent material includes preparing a calcined product having a composition containing at least one first element selected from the group consisting of Ba, Sr, Ca, and Mg, at least one second element selected from the group consisting of Eu, Ce, Tb, and Mn, and Si and N, and bringing the calcined product into contact with a fluorine-containing substance at a temperature in a range of −20° C. or higher and lower than 150° C.

17 Claims, 4 Drawing Sheets

METHOD OF PRODUCING NITRIDE FLUORESCENT MATERIAL

CROSS-REFERENCE TO RELATED APPLICATION

This application claims the benefit of Japanese Patent Application No. 2016-130244, filed on Jun. 30, 2016, the disclosure of which is hereby incorporated by reference in its entirety.

BACKGROUND

Technical Field

The present disclosure relates to a method of producing a nitride fluorescent material.

Description of Related Art

A light emitting device that can emit light of various colors according to the principle of light mixing has been developed by combining a light source with a fluorescent material, which is excited by the light from the light source and which emits light of a color different from the color of the light source. In particular, a light emitting device, in which a light emitting diode (hereinafter referred to as "LED") is combined with a fluorescent material, is actively applied to lighting systems, backlights for liquid-crystal display devices, small-size strobes, etc., and has become popular. In order to emit light containing red color from such a light emitting device, a fluorescent material having an emission peak wavelength in a wavelength range of 570 nm or more and 670 nm or less is desired as the fluorescent material.

A nitride fluorescent material is known to emit light containing red color. For example, Japanese Unexamined Patent Publication No. 2003-515655 discloses a nitride fluorescent material containing $(Ba,Sr,Ca)_2Si_5N_8$ as the mother crystal and a divalent europium ($Eu^{2+}$) as the activator element.

SUMMARY

An embodiment of the present disclosure provides a method of producing a nitride fluorescent material. The method includes preparing a calcined product having a composition that contains at least one first element selected from the group consisting of Ba, Sr, Ca, and Mg, at least one second element selected from the group consisting of Eu, Ce, Tb, and Mn, and Si and N, and bringing the calcined product into contact with a fluorine-containing substance at a temperature in a range of −20° C. or higher and lower than 150° C.

According to an embodiment of the present disclosure, a method for producing a nitride fluorescent material having relatively high emission intensity may be provided.

DETAILED DESCRIPTION

A method of producing a nitride fluorescent material of the present disclosure is described hereinunder with reference to embodiments thereof. However, the embodiments shown below are for exemplifying the method of producing a nitride fluorescent material for the purpose of embodying the technical ideal of the present invention, and therefore the present invention is not limited to the embodiments of the method for producing a nitride fluorescent material shown below. The relationship between the color name and the chromaticity coordinate, and the relationship between the wavelength range of light and the color name of monochromatic light follow JIS Z8110.

Method of Producing Nitride Fluorescent Material

The method of producing a nitride fluorescent material according to an embodiment of the present disclosure includes preparing a calcined product having a composition that contains at least one first element selected from the group consisting of barium (Ba), strontium (Sr), calcium (Ca), and magnesium (Mg), at least one second element selected from the group consisting of europium (Eu), cerium (Ce), terbium (Tb), and manganese (Mn), and silicon (Si) and nitrogen (N), and bringing the calcined product into contact with a fluorine-containing substance at a temperature in a range of −20° C. or higher and lower than 150° C.

Preparing Calcined Product

From the viewpoint of stabilizing crystal structure, the calcined product preferably contains at least one first element selected from Ba and Sr, more preferably Ba. When the calcined product contains Ba, a nitride fluorescent material having an emission peak wavelength on a relatively short wave side can be obtained stably. The first element may be a single element alone or may contain two or more kinds of elements.

In the case where the first element contains two or more kinds of elements, and where one element is Ba and the other one element is represented by M12, the molar ratio of Ba to the other element M12 (Ba:M12) is preferably in a range of 20:80 or more and 100:0 or less, more preferably in a range of 30:70 or more and 99:1 or less.

The second element is an activator element that is to be an emission center of the fluorescent material, and preferably contains at least one element selected from the group consisting of Eu, Ce, and Tb, more preferably at least one element selected from Eu and Ce, even more preferably Eu. Europium (Eu) mainly has divalent or trivalent energy level, and in the calcined product for use in the nitride fluorescent material of this embodiment of the present disclosure, at least $Eu^{2+}$ is preferably used as the activator.

The second element may be a single element alone or may contain two or more kinds of elements as combined, so far as it increases the emission intensity and absorbs light from excited light to emit light with a desired color. In the case where the second element contains two or more kinds of elements, for example, in the case where one element is Eu and the other element is at least one element selected from the group consisting of Ce, Tb and Mn, the other elements than Eu act as a co-activator and can change color.

Preferably, the calcined product has a composition represented by the following formula (I):

$$(M1_{1-y}M2_y)_2Si_5N_8 \tag{I}$$

where M1 represents at least one element selected from the group consisting of Ba, Sr, Ca, and Mg, M2 represents at least one element selected from the group consisting of Eu, Ce, Tb, and Mn, and y is a number satisfying 0.001≤y<0.5.

More preferably, the calcined product has a composition represented by the following formula (II):

$$(Ba_{1-x-y}M1 2_x M2_y)_2 Si_5 N_8 \quad (II)$$

where M12 represents at least one element selected from the group consisting of Sr, Ca, and Mg, M2 represents at least one element selected from the group consisting of Eu, Ce, Tb, and Mn, and x and y each are numbers satisfying 0.0≤x<1.0, 0.001≤y<0.5, and 0.001≤x+y<1.0.

In the formula (I) or the formula (II), the parameter y indicates the amount of the activator of at least one element selected from the group consisting of Eu, Ce, Tb, and Mn, and can be adequately selected so as to attain the desired characteristics. The parameter y is, from the viewpoint of increasing the light emission intensity of the fluorescent material, more preferably 0.005≤y≤0.4, even more preferably 0.007≤y≤0.3, further more preferably 0.01≤y≤0.2.

In the formula (II), the parameter x indicates the amount of at least one alkaline earth metal selected from the group consisting of Sr, Ca, and Mg that forms a crystal structure along with Ba, and is, though depending on the kind of the activator, more preferably 0.0≤x≤0.75, even more preferably 0.01≤x≤0.60, still more preferably 0.05≤x≤0.50. Falling within the range, the light emitting device containing the nitride fluorescent material can stably provide a light emitting device having desired emission characteristics.

The calcined product in an embodiment of the present disclosure can be prepared by mixing the raw materials, which are needed to form the calcined product, to give a mixture of the raw materials and heat-treating the mixture to form the calcined product.

The raw materials needed to form the calcined product include a compound containing at least one first element selected from the group consisting of Ba, Sr, Ca, and Mg, a compound containing at least one second element selected from the group consisting of Eu, Ce, Tb, and Mn, a compound containing Si, and a nitrogen gas ($N_2$) or a compound N. The silicon-containing compound and the nitrogen-containing compound may be one and the same compound, for example, like silicon nitride ($Si_3N_4$).

The first element-containing compound includes hydrides, nitrides, fluorides, oxides, carbonates, chlorides containing at least one element selected from a group consisting of Ba, Sr, Ca, and Mg. From the viewpoint that the calcined product to be obtained contains few impurities and that the emission intensity can be increased, hydrides, nitrides or fluorides containing at least one element selected from a group consisting of Ba, Sr, Ca, and Mg are preferred, and nitrides are more preferred. By using the first element-containing nitride as the raw material, it is possible to prevent formation of a calcined product having any other composition than the desired composition. The compound containing at least one element selected from the group consisting of Ba, Sr, Ca, and Mg may contain a tiny amount of at least one element selected from the group consisting of Li, Na, K, B, and Al.

Specifically, the first element-containing compound includes $BaH_2$, $Ba_3N_2$, $BaF_2$, $SrH_2$, $Sr_3N_2$, $Sr_2N$, $SrN$, $SrF_2$, $CaH_2$, $Ca_3N_2$, $CaF_2$, $MgH_2$, $Mg_3N_2$, $MgF_2$, etc.

The second element-containing compound includes hydrides, nitrides, fluorides, oxides, carbonates, chlorides containing at least one element selected from the group consisting of Eu, Ce, Tb, and Mn. From the viewpoint that the calcined product to be obtained contains few impurities and that the emission intensity can be increased, hydrides, nitrides or fluorides containing at least one element selected from the group consisting of Eu, Ce, Tb, and Mn are preferred, and nitrides are more preferred. By using the second element-containing nitride as the raw material, it is possible to prevent formation of a calcined product having any other composition than the desired composition.

Specifically, the second element-containing compound includes $EuH_3$, $EuN$, $EuF_3$, $CeH_3$, $CeN$, $CeF_3$, $TbH_3$, $TbN$, $TbF_3$, $MnN_2$, $MnN_5$, $MnF_2$, etc.

The Si-containing compound may be a metal containing substantially Si alone, or may be an alloy of Si where a part of Si is substituted with at least one metal selected from the group consisting of Ge, Sn, Ti, Zr, Hf, B, Al, Ga, and In. The Si-containing compound includes oxides, nitrides, fluorides, imide compounds, amide compounds, etc. From the viewpoint that the calcined product to be obtained contain few impurities and that the emission intensity be increased, nitrides, imide compounds, amide compounds, or fluorides are preferred, and nitrides are more preferred. By using a nitride as the raw material, it is possible to prevent formation of a calcined product having any other composition than the desired composition.

Specifically, the Si-containing compound includes $SiO_2$, $Si_3N_4$, $SiF_4$, $Si(NH)_2$, $Si_2N_2NH$, $Si(NH_2)_4$, etc.

Preferably, each raw material has a mean particle size of in a range of 0.1 μm or more and 15 μm or less, more preferably falling within a range of 0.1 μm to 10 μm, from the viewpoint of the reactivity with other raw materials and for particle size control during or after calcining. The particle size falling within the above range can be attained by grinding.

Preferably, the raw materials are purified ones. Purified materials do not require a purification step and therefore the production process can be simplified and an inexpensive fluorescent material can be provided.

The raw material mixture may contain a flux. When the raw material mixture contains a flux, the reaction between the raw materials can be promoted and further, the solid-phase reaction can go on homogeneously to give large particles, and accordingly, a calcined product for use for obtaining a fluorescent material having more excellent emission characteristics can be produced. This is because, for example, the temperature for heat treatment to provide the calcined product is in a range of 1300° C. or higher and 2100° C. or lower, and the temperature would be nearly the same as the liquid phase formation temperature for the flux, halides. As the halides, chlorides, fluorides of rare earth metals, alkaline earth metals, or alkali metals can be used. Regarding the flux, the elemental ratio of the cation to be contained in the flux may be so controlled as to be in a composition of the desired calcined product, and the flux of the type may be added as a part of the raw materials for the fluorescent material, or after the raw materials have been blended to be in a composition of the desired calcined product, and then the flux may be added thereto later.

In the case where the raw material mixture contains a flux, the flux components can promote the reactivity, but when the amount of the flux is too much, the emission strength may lower. Consequently, the content of the flux is, for example, preferably 10% by mass or less in the raw material mixture, more preferably 5% by mass or less.

Even in the case where a fluoride is used as the flux, the fluorine element remains little in the calcined product through heat treatment at a range of 1300° C. or higher and 2100° C. or lower, and even in the case where a fluorine element-containing flux is used, the fluorine element in the calcined product to be obtained after heat treatment is generally 0.1% by mass or less, preferably 0.08% by mass or less.

In the case where a calcined product having a composition shown by the above-mentioned formula (I) is obtained, specifically, the raw materials are preferably so weighed that the amount of M1, the amount of M2, the amount of Si, and the amount of Ni in the mixture of the raw materials could satisfy a molar ratio of M1:M2:Si:N=(1.80 to 1.995): (0.005 to 0.20):5:8.

The weighed raw materials are mixed in wet or in dry using a mixing machine to give a raw material mixture. The mixing machine may be a ball mill that is generally used industrially, as well as a grinding machine such as a shaking mill, a roll mill, a jet mill to enlarge the specific surface area. On the other hand, for controlling the specific surface area of the powder to fall within a predetermined range, the powder may be classified using a wet-type separator such as a sedimentation tank, a hydrocyclone, a centrifugal separator generally used industrially, or a dry-type classifier such as a cyclone, air separator, etc.

The raw material mixture is set in a crucible or a boat formed of carbon such as graphite, or boron nitride (BN), alumina ($Al_2O_3$), tungsten (W), molybdenum (Mo), and heat-treated in a furnace to give a calcined product.

In the production method of a fluorescent material according to an embodiment of the present disclosure, it is preferable that the raw material mixture be calcined in a reductive nitrogen atmosphere to give a calcined product. More preferably, the baking atmosphere is a reductive hydrogen gas-containing nitrogen atmosphere. The reductive hydrogen gas-containing nitrogen atmosphere preferably contains nitrogen gas in an amount of 70% by volume or more, more preferably 80% by volume or more, even more preferably 90% by volume or more. The reductive hydrogen gas-containing nitrogen atmosphere preferably contains hydrogen gas in an amount of 1% by volume or more, more preferably 5% by volume or more, even more preferably 10% by volume or more. The calcining atmosphere may also be a reductive atmosphere using a solid carbon in an air atmosphere, etc.

By calcining the starting material mixture in a highly-reductive atmosphere such as a reductive atmosphere containing hydrogen and nitrogen, a calcined product for forming a fluorescent material having a high emission intensity can be produced. This is because, for example, when the second element serving as an activator is Eu, the proportion of the divalent Eu capable of contributing toward light emission can increase in the calcined product. The divalent Eu is readily oxidized into a trivalent Eu, but in calcining in a highly-reductive atmosphere containing hydrogen and nitrogen, the trivalent Eu is reduced into a divalent Eu, and therefore, in the calcined product, the proportion of the divalent Eu increases, that is, a calcined product for forming a fluorescent material having a high emission intensity can be obtained.

In the production method for a nitride fluorescent material according to an embodiment of the present disclosure, the heat treatment temperature for producing a calcined product is preferably in a range of 1,300° C. or higher and 2,100° C. or lower, more preferably in a range of 1,500° C. or higher and 2,000° C. or lower, even more preferably in a range of 1,600° C. or higher and 1950° C. or lower. When the heat treatment temperature is in a range of 1,300° C. or higher and 2,100° C. or lower, thermal decomposition can be prevented and therefore a calcined product for forming a fluorescent material having the intended composition, having a stable crystal structure and having a high light emission intensity can be obtained.

The heat treatment may be a multistage heat treatment of carrying out heat treatment twice or more. For example, in a two-stage heat treatment, it is preferable that the first-stage heat treatment be carried out at a range of 1,000° C. or higher and lower than 1,500° C. and the second-stage heat treatment be at a temperature in a range of 1,500° C. or higher and 2,100° C. or lower. When the first-stage heat treatment temperature is 1,000° C. or higher and lower than 1,500° C., a calcined product having the intended composition is easy to produce. When the second-stage heat treatment temperature is 1,500° C. or higher and 2,100° C. or lower, the resultant calcined product can be prevented from being decomposed and a calcined product for producing a fluorescent material having a stable crystal structure and having a high light emission intensity is easy to produce.

The pressure in the heat treatment atmosphere is preferably an increased pressure in a range of 0.1 MPa or more and 200 MPa or less. In the calcined product to be obtained through the heat treatment, the crystal structure is more readily decomposed at a higher heat treatment temperature, but in an increased pressure atmosphere, decomposition of the crystal structure can be prevented and reduction in the emission intensity can be prevented. The pressure in the heat treatment atmosphere is, as a gauge pressure, preferably in a range of 0.1 MPa or more and 100 MPa or less, more preferably in a range of 0.5 MPa or more and 10 MPa or less, and from the viewpoint of easiness in production, the pressure is even more preferably 1.0 MPa or less.

The heat treatment time may be adequately selected depending on the heat treatment temperature and the pressure atmosphere during heat treatment, and is preferably in a range of 0.5 hours or more and 20 hours or less. In multistage heat treatment, it is also desirable that the heat treatment time for each stage be in a range of 0.5 hours or more and 20 hours or less. When the heat treatment time is in a range of 0.5 hours or more and 20 hours or less, decomposition of the resultant calcined product can be prevented and a calcined product for producing a fluorescent material having a stable crystal structure and a high emission intensity can be obtained, and in addition, the production cost can be reduced and the production time can be relatively shortened. The heat treatment time is more preferably in a range of 1 hour or more and 10 hours or less, even more preferably in a range of 1.5 hours or more and 9 hours or less.

In the production method of a fluorescent material according to an embodiment of the present disclosure, the calcined product obtained through heat treatment may be post-treated for grinding, dispersion, solid-liquid separation, drying. The solid-liquid separation may be carried out according to an ordinary industrial process of filtration, suction filtration, pressure filtration, centrifugation, decantation, etc. The drying may be carried out using an ordinary industrial apparatus of a vacuum drier, a hot air heating drier, a conical drier, a rotary evaporator, etc.

Preferably, the calcined product has a structure having at least partly a high crystallinity. For example, a glass body (amorphous) has an irregular and low-crystalline structure, and therefore when the reaction condition in the production process thereof is not controlled strictly uniformly, the product tends to have color unevenness. The calcined product for use in an embodiment of the present disclosure preferably has a structure having at least partly a high crystallinity. The calcined product having a structure that has at least partly a high crystallinity tends to be readily produced and processed. In addition, a fluorescent material produced using the calcined product having a structure that has at least partly a high crystallinity is readily dispersed in a resin and therefore a resin-containing fluorescent member is easy to produce. Specifically, it is preferable that the calcined product for use for a fluorescent material have a crystalline structure in which the proportion of the light-emitting crystal phase is, for example, 50% by mass or more, more preferably 80% by mass or more. When the calcined product has a crystal phase in a proportion of 50% by mass or more, the degree of crystallinity of the calcined product or the fluorescent material capable of providing light emission on a practicable level can be determined, for example, through X-ray diffraction spectrometry (XRD). When the object to be analyzed is a crystalline one, that is, one having a high crystallinity, it gives a sharp diffraction peak, and when amorphous, it gives a broad diffraction peak. From the proportion of the sharp diffraction peaks to the broad diffraction peaks, the proportion of the crystal phase can be determined. In the case where a phase having a composition except the phase having an intended composition is formed, a diffraction peak indicating the phase having the other composition than the intended composition tends to appear.

Contact of Calcined Product with Fluorine-Containing Substance

The resultant calcined product is brought into contact with a fluorine-containing substance at a temperature in a range of −20° C. or higher and lower than 150° C. to give a nitride fluorescent material.

By bringing the calcined product into contact with a fluorine-containing substance at a predetermined temperature, a nitride fluorescent material having relatively high emission intensity can be obtained.

Though not clarified as yet, the mechanism how the emission intensity of the nitride fluorescent material to be obtained through contact of the calcined product with a fluorine-containing substance could be high may be presumed as follows. The calcined product has an impurity phase having a composition except the intended composition. Examples of the impurity phase include an impurity phase having a composition of $(Sr, Ba)Si_4N_7:Eu^{2+}$, etc. The calcined product may contain a low-brightness phase having defects or having a low crystallinity, and therefore having low emission intensity. By bringing the calcined product with a fluorine-containing substance at a specific temperature, for example, silicon in the impurity phase contained in the calcined product or silicon in the low-brightness phase contained therein may react with the fluorine in the fluorine-containing substance to form a fluoride. The fluoride removes, from the reaction system, the impurity phase or the low-brightness phase and, as a result, emission intensity reduction may be reduced. Accordingly, it is considered that a nitride fluorescent material having a desired composition and having a high crystallinity can be obtained, and the emission intensity thereof can be high.

The temperature at which the calcined product is brought into contact with a fluorine-containing substance is in a range of −20° C. or higher and lower than 150° C., preferably in a range of −10° C. or higher and 145° C. or lower, more preferably in a range of 0° C. or higher and 140° C. or lower, even more preferably in a range of P° C. or higher and 130° C. or lower, still more preferably 5° C. or higher and 120° C. or lower. The temperature at which the calcined product is brought into contact with a fluorine-containing substance may be room temperature, and the room temperature is, for example, in a range of 10° C. or higher and 32° C. or lower.

In the case where the temperature at which the calcined product is brought into contact with a fluorine-containing substance is lower than −20° C., the impurity phase or the low-brightness phase contained in the calcined product could hardly react with the fluorine-containing substance even though the calcined product is brought into contact with a fluorine-containing substance. On the other hand, when the temperature is higher than 150° C., the reaction between the nitride fluorescent material to be obtained, which is contained in the calcined product, with the fluorine-containing substance may be too much resulting in a composition that differs from the composition of the nitride fluorescent material to be obtained. For example, in the case where the nitride fluorescent material having a composition to be obtained is a nitride fluorescent material activated with a divalent Eu, the divalent Eu may be oxidized by the fluorine-containing substance to be converted into a trivalent Eu so that the proportion of the divalent Eu that contributes toward light emission decreases relatively and the emission intensity of the nitride fluorescent material may be thereby lowered.

The fluorine-containing substance is preferably a fluorine gas ($F_2$) or a gaseous fluorine compound capable of keeping the gaseous state thereof within a temperature range of −20° C. or higher and 150° C. or lower so that it can readily react within the temperature range. The fluorine compound includes $CF_4$, $CHF_3$, $SiF_4$, $NF_3$, $PF_5$, $PF_3$, $BF_3$, etc.

The fluorine-containing substance is preferably at least one selected from the group consisting of $F_2$, $CHF_3$, $CF_4$, $SiF_4$, and $NF_3$, more preferably $F_2$ (fluorine gas).

The atmosphere in which the calcined product is brought into contact with the fluorine-containing substance is preferably an inert gas atmosphere. The inert gas atmosphere is preferably a fluorine gas or a gaseous fluorine compound-containing atmosphere.

In this present disclosure, the inert gas atmosphere means an atmosphere having argon, helium, nitrogen as the main ingredient. The inert gas atmosphere may contain oxygen as an inevitable impurity, but in the present disclosure, when the oxygen concentration in the atmosphere is 15% by volume or less, the atmosphere may be referred to as an inert gas atmosphere. The oxygen concentration in the inert gas atmosphere is preferably 10% by volume or less, more preferably 5% by volume or less, even more preferably 1% by volume or less. When the oxygen concentration is more than a predetermined level, the particles of the fluorescent material may be overly oxidized.

The concentration of the fluorine-containing substance in the inert gas atmosphere is preferably in a range of 2% by volume or more and 25% by volume or less, more preferably in a range of 5% by volume or more and 22% by volume or less. When the concentration of the fluorine-containing substance in the inert gas atmosphere is 2% by volume or more and 25% by volume or less, the impurity phase or the low-brightness phase contained in the calcined product may readily react with the fluorine-containing substance and the resultant nitride fluorescent material can have relatively high emission intensity.

The time for which the calcined product is kept in contact with the fluorine-containing substance is preferably in a range of 1 hour or more and 10 hours or less, more preferably in a range of 2 hours or more and 8 hours or less. When the time for which the calcined product is kept in contact with the fluorine-containing substance is in a range of 1 hour or more and 10 hours or less, the impurity phase or the low-brightness phase contained in the calcined product can readily react with the fluorine in the fluorine-containing substance during contact of the calcined product with the fluorine-containing substance, and the fluoride formed through the reaction can be readily removed from the calcined product, and accordingly, the impurity phase or the low-brightness phase that causes emission intensity reduction can be reduced and the emission intensity of the resultant nitride fluorescent material can be thereby increased.

Post-Process

After the calcined product has been brought into contact with the fluorine-containing substance, the resultant nitride fluorescent material may be subjected to post treatment of grinding treatment, powdering treatment, classification treatment, etc.

Nitride Fluorescent Material

The nitride fluorescent material produced by the method according to an embodiment of the present disclosure has a composition containing at least one first element selected from the group consisting of Ba, Sr, Ca, and Mg, at least one second element selected from the group consisting of Eu, Ce, Tb, and Mn, and Si and N. The nitride fluorescent material produced by the method according to an embodiment of the present disclosure contains a fluorine element, and the fluorine element content therein is preferably in a range of 1% by mass or more and 10% by mass or less. It is considered that, in the nitride fluorescent material obtained through contact of the calcined product with a fluorine-containing substance at a specific temperature, a fluorine element remains in the area close to the surface of the calcined product or in the surface thereof. Even though a fluorine element remains in the nitride fluorescent material, the emission intensity of the resultant nitride fluorescent material is not lowered, but rather the impurity phase or the low-brightness phase is reduced through contact of the calcined product with a fluorine-containing substance, and therefore the emission intensity of the fluoride fluorescent material is kept high.

The fluorine element content in the nitride fluorescent material produced by the method according to an embodiment of the present disclosure is more preferably in a range of 1.1% by mass or more, even more preferably 1.2% by mass or more, and more preferably in a range of 8.0% by mass or less, even more preferably 5.0% by mass or less.

The nitride fluorescent material produced by the method according to an embodiment of the present disclosure preferably has a composition represented by the above-mentioned formula (I) or the above-mentioned formula (II).

The nitride fluorescent material produced by the method according to an embodiment of the present disclosure is activated by the second element, preferably by europium (Eu), and absorbs light having an emission peak wavelength covering from UV light to visible light to thereby emit red light. The nitride fluorescent material absorbs light having an emission peak wavelength falling within a range of 400 nm or more and 570 nm or less that is a range covering from UV light to visible light, and thereby emits light having an emission peak wavelength within a wavelength range of 570 nm or more and 670 nm or less. The nitride fluorescent material produced by the method according to an embodiment of the present disclosure more preferably has an emission peak wavelength falling within a wavelength range of 580 nm or more and 650 nm or less, even more preferably an emission peak wavelength falling within a wavelength range of 600 nm or more and 630 nm or less. The full width at half maximum of the emission spectrum of the nitride fluorescent material is, for example, 95 nm or less, preferably 92 nm or less, more preferably 90 nm or less. Having a smaller full width at half maximum of an emission peak, the nitride fluorescent material can have higher color purity.

The reflectance at 450 nm of the nitride fluorescent material obtained by the method according to an embodiment of the present disclosure is preferably 12.5% or less, more preferably 12.0% or less, even more preferably 11.9% or less.

In the case where the reflectance at 450 nm of the nitride fluorescent material is 12.5% or less and is relatively low, it is considered that, when the nitride fluorescent material of the type is incorporated in a light emitting device along with an excitation light source therein, absorption of light emitted from the excitation light source could be large and the absorbed light could be subjected to wavelength change by the nitride fluorescent material to thereby increase the emission intensity falling within a desired wavelength range.

The reflectance at 730 nm of the nitride fluorescent material obtained by the method according to an embodiment of the present disclosure is preferably 90% or more, more preferably the reflectance is 91% or more, and even more preferably 92% or more. When the reflectance at 730 nm of the nitride fluorescent material obtained by the method according to an embodiment of the present invention is 90% or more, the reflectance thereof in a wavelength range of 570 nm or more and 800 nm or less is high, and therefore the nitride fluorescent material can efficiently emit light that falls within a desired wavelength range.

The mean particle size of the nitride fluorescent material obtained by the method according to an embodiment of the present invention is preferably 2.0 μm or more, more preferably 4.0 μm or more, even more preferably 5.0 μm or more, and is preferably 30.0 μm or less, more preferably 25.0 μm or less, even more preferably 20.0 μm or less. When the mean particle size of the nitride fluorescent material is in a range of 2.0 μm or more and 30.0 μm or less, the light absorption thereof from an excitation light source is high and therefore the material can emit red light having a desired chromaticity at high light emission intensity. In addition, when the mean particle size of the nitride fluorescent material is 2.0 μm or more and 30.0 μm or less, the workability in the production process for producing a light emitting device by incorporating the nitride fluorescent material into the light emitting device to be mentioned hereinunder can be enhanced.

In this description, the mean particle size of the nitride fluorescent material is a volume-average particle size (median diameter), and can be measured, for example, using a laser diffraction particle sizer (manufactured by MALVERN Corporation, trade name: MASTER SIZER 2000).

The nitride fluorescent material produced by the method according to an embodiment of the present disclosure can be used in a light emitting device. A light emitting device is equipped with, for example, the nitride fluorescent material produced by the method according to an embodiment of the present disclosure, and an excitation light source. As the excitation light source, a light emitting element can be used, and is preferably one capable of emitting light having a light emission peak wavelength falling within a wavelength range of 350 nm or more and 570 nm or less. The range of the light emission peak wavelength of the light emitting element is more preferably within a range of 390 nm or more and 480 nm or less, even more preferably within a range of 420 nm or more and 470 nm or less, still more preferably within a range of 440 nm or more and 460 nm or less, further more preferably within a range of 445 nm or more and 455 nm or less. As the light emitting element of the type, a light emitting element formed of a nitride semiconductor ($In_XAl_YGa_{1-X-Y}N$, $0 \leq X$, $0 \leq Y$, $X+Y \leq 1$) is preferably used.

EXAMPLES

Some aspect of the present invention will be described more specifically with reference to the Examples below.

Production Example 1

A calcined product having a composition containing Ba, Sr, and Eu was produced. Specifically, for producing a calcined product having a composition represented by the above-mentioned general formula(II) where M12 is Sr and M2 is Eu, raw materials of $Ba_3N_2$, $SrN_w$ (w corresponds to 2/3), EuN and $Si_3N_4$ were metered in a glove box with an inert gas atmosphere in such a manner that the molar ratio of the amounts thereof could be in a compositional ratio of Ba:Sr:Eu:Si=1.47:0.47:0.06:5, and mixed to prepare a raw material mixture. The resultant raw material mixture was put into a crucible and heat treated at 1800° C. for 5 hours in an inert gas atmosphere containing nitrogen gas in an amount of 80% by volume or more and under a gas pressure as a gauge pressure of 0.92 MPa (absolute pressure 1.02 MPa), thereby producing a calcined product. In the resultant calcined product, the particles were sintered together, and therefore through dispersion followed by classification by sieving to remove coarse grains or fine grains, a calcined product having a well-ordered particle size and having a composition of $(Ba_{0.735}Sr_{0.235}Eu_{0.03})_2Si_5N_8$ was obtained.

Example 1

The calcined product obtained in Production Example 1 was brought into contact with fluorine gas ($F_2$) in an atmosphere containing fluorine gas ($F_2$) and, as an inert gas, nitrogen gas ($N_2$) and having a fluorine gas concentration of 20% by volume and a nitrogen gas concentration of 80% by volume, at 30° C., almost room temperature for a contact period of time of 8 hours, thereby giving a nitride fluorescent material powder.

Comparative Example 1

The calcined product obtained in Production Example 1 was powdered to be a nitride fluorescent material powder of Comparative Example 1.

Example 2

A nitride fluorescent material powder was produced under the same condition as in Example 1 except that the temperature for contact of the calcined product obtained in Production Example 1 with fluorine gas ($F_2$) was changed to 100° C.

Comparative Example 2

A nitride fluorescent material powder was produced under the same condition as in Example 1 except that the temperature for contact of the calcined product obtained in Production Example 1 with fluorine gas ($F_2$) was changed to 150° C.

Evaluation

The products were evaluated according to the methods mentioned below.

Light Emission Characteristics

The nitride fluorescent materials of the Examples and the Comparative Examples were analyzed for the light emission characteristics thereof, using a fluorospectrophotometer (product name: QE-2000, manufactured by Otsuka Electronics Co., Ltd.) at a wavelength of excitation light of 450 nm. The energy (relative light emission intensity: %) was obtained on the resultant light emission spectrum. The results are shown in Table 1 and FIG. 1. The relative light emission intensity is calculated taking the light emission intensity of the nitride fluorescent material of Comparative Example 1 as 100%. The full width at half maximum of the light emission peak wavelength of the light emission spectrum of each of the nitride fluorescent materials is shown in Table 1.

Reflectance

Using a fluorospectrophotometer (product name: F-4500, manufactured by Hitachi High-Technologies Corporation), the reflectance at a wavelength of 450 nm and a wavelength of 730 nm of each of the nitride fluorescent materials of Examples and Comparative Examples was measured.

Specifically, using $CaHPO_4$ as a standard for the reflectance, the reflectance of each material was measured. The results are shown in Table 1.

Analysis for Fluorine Content

Using an inductively coupled plasma emission spectrometer (manufactured by Perkin Elmer Corporation), the nitride fluorescent materials of Examples and Comparative Examples were analyzed through ICP emission spectrometry and then further analyzed for composition analysis to thereby determine the fluorine (F) element content in the nitride fluorescent material. The results are shown in Table 1.

SEM Micrograph

Figure 2:
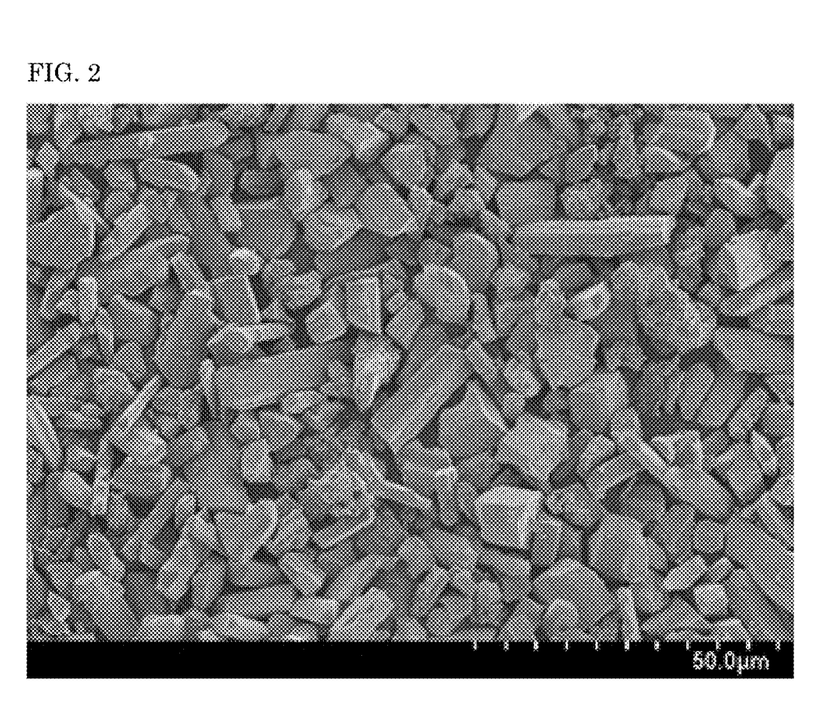
FIG. 2 is a scanning electron microscope (SEM) micrograph of a nitride fluorescent material of a first example according to an embodiment of the present disclosure.
Figure 3:
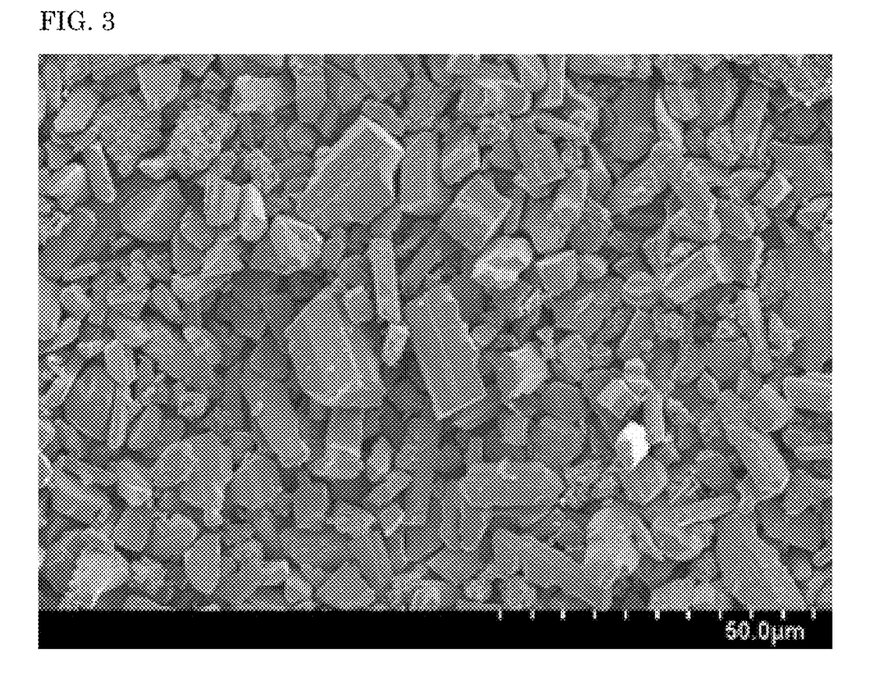
FIG. 3 is a SEM micrograph of a nitride fluorescent material of a first comparative example.
Figure 4:
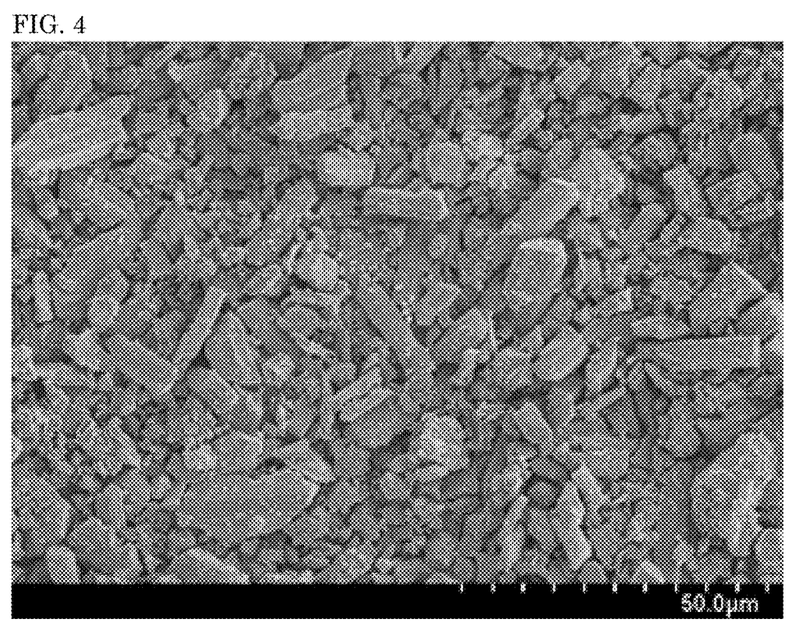
FIG. 4 is a SEM micrograph of a nitride fluorescent material of a second comparative example.

Using a scanning electron microscope (SEM), SEM pictures of the nitride fluorescent material of Example 1 and the nitride fluorescent materials of Comparative Examples 1 and 2 were taken. FIG. 2 is a SEM micrograph of the nitride fluorescent material of Example 1; FIG. 3 is a SEM micrograph of the nitride fluorescent material of Comparative Example 1; FIG. 4 is a SEM micrograph of the nitride fluorescent material of Comparative Example 2.

Average Particle Diameter

Using a laser diffraction particle sizer distribution measuring equipment (product name: MASTER SIZER 2000, manufactured by Malvern Instruments Ltd.), the mean particle size of each of the nitride fluorescent materials of Examples and Comparative Examples was determined. The results are shown in Table 1. The mean particle size is a volume-average particle size (median diameter).

TABLE 1

| | Treatment Temperature | Mean Particle Size (μm) | Full width at half maximum (nm) | Relative light Emission Intensity (%) | Reflectance (%) 450 nm | Reflectance (%) 730 nm | F Content (% by mass) |
|---|---|---|---|---|---|---|---|
| Comparative Example 1 | Not Treated | 7.4 | 89 | 100.0 | 13.1 | 94.0 | less than 0.001 |
| Example 1 | 30° C. | 7.1 | 88 | 104.3 | 11.8 | 95.5 | 1.4 |
| Example 2 | 100° C. | 7.2 | 89 | 101.1 | 9.9 | 92.9 | 3.8 |
| Comparative Example 2 | 150° C. | 7.4 | 90 | 93.9 | 27.0 | 97.6 | 20.3 |

As shown in Table 1, the nitride fluorescent materials of Examples 1 and 2 that had been kept in contact with the fluorine-containing substance at a temperature of −20° C. or higher and lower than 150° C. exhibited a higher relative light emission intensity than the untreated nitride fluorescent material of Comparative Example 1 that had not been brought into contact with a fluorine-containing substance. The reflectance at a wavelength of 450 nm of the nitride fluorescent materials of Examples 1 and 2 was lower than that of the nitride fluorescent materials of Comparative Examples 1 and 2, and it is anticipated that, when incorporated in a light emitting device, the former nitride fluorescent materials can highly absorb the light from an excitation light source. In addition, the reflectance at a wavelength of 730 nm of the nitride fluorescent materials of Examples 1 and 2 was more than 92% and was high, and it is confirmed that the nitride fluorescent materials of Examples 1 and 2 can efficiently emit light falling within a wavelength range of 570 nm or more and 800 nm or less.

The reflectance at a wavelength of 730 nm of the nitride fluorescent material of Comparative Example 2 was higher than those of Examples 1 and 2 and Comparative Example 1, but the reflectance at 450 nm of the former was also higher than that of the latter, and it is anticipated that, when incorporated in a light emitting device, the light absorption from the excitation light source by the former nitride fluorescent material would be lower than that by the nitride fluorescent materials of Examples 1 and 2 and Comparative Example 1. In addition, the relative light emission intensity of the nitride fluorescent material of Comparative Example 2 was lower than that of the nitride fluorescent materials of Examples 1 and 2 and Comparative Example 1.

Figure 1:
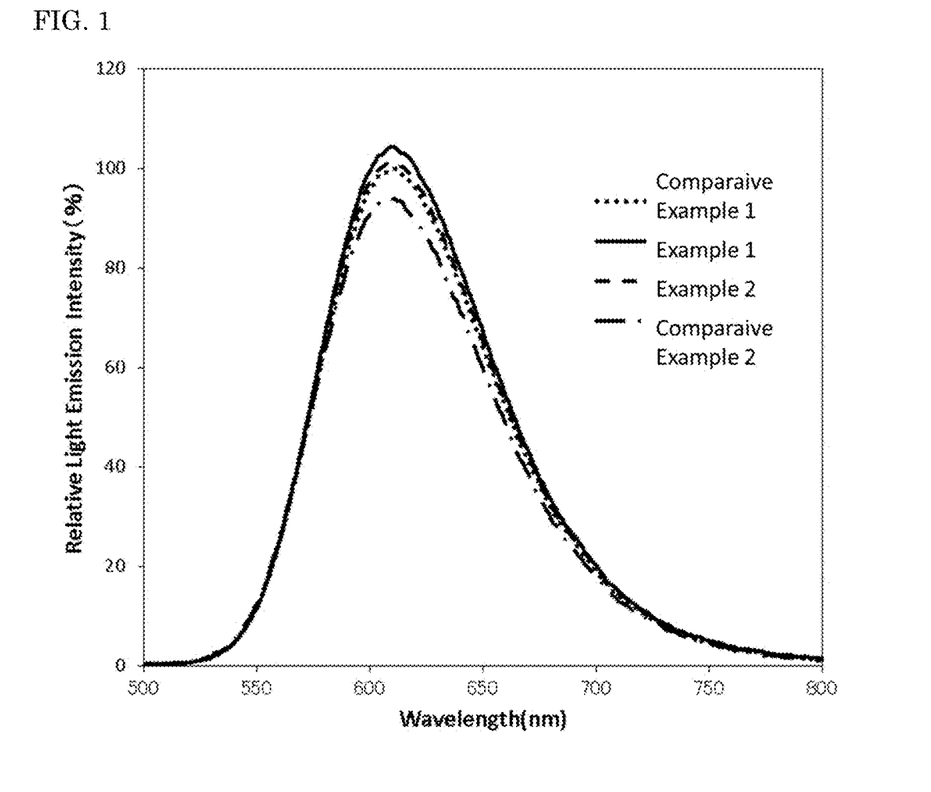
FIG. 1 is an emission spectral diagram showing relative emission intensity to wavelength for each nitride fluorescent material of examples according to an embodiment of the present disclosure and comparative examples.

As shown in FIG. 1, the relative light emission intensity of the nitride fluorescent materials of Examples 1 and 2 was higher than that of the nitride fluorescent material of Comparative Example 1, and the light emission peak wavelength profile of the light emission spectrum of the nitride fluorescent materials of Examples 1 and 2 was nearly the same as the light emission peak wavelength profile of the light emission spectrum of the nitride fluorescent material of Comparative Example 1, and it is confirmed that the nitride fluorescent materials of Examples 1 and 2 emitted light having nearly the same chromaticity as that of Comparative Example 1. In addition, as shown in Table 1, the full widths at half maximum of the light emission peak wavelength of the nitride fluorescent materials of Examples 1 and 2 are nearly the same as or is somewhat smaller than the full widths at half maximum of the light emission peak wavelength of the nitride fluorescent materials of Comparative Examples 1 and 2. The color purity in emission from each of the nitride fluorescent materials of Examples 1 and 2 was equal to or higher than that from each of the nitride fluorescent materials of Comparative Examples 1 and 2.

As shown in FIG. 2, in the nitride fluorescent material of Example 1, the particle shape is relatively uniform as observed from the SEM micrograph. The outward appearance of the nitride fluorescent material of Example 1 having the SEM micrograph of FIG. 2 was almost the same as that of the nitride fluorescent material not brought into contact with a fluorine-containing substance of Comparative Example 1 having the SEM micrograph of FIG. 3.

On the other hand, the nitride fluorescent material of Comparative Example 2 shown in FIG. 4 contained fine particles as mixed with relatively coarse particles that would be particles of the nitride fluorescent material, as observed on the SEM micrograph thereof, and there may be a possibility that any other compound than the nitride fluorescent material having the intended composition would exist in the material.

According to the production method according to an embodiment of the present disclosure, a nitride fluorescent material having relatively higher light emission intensity can be obtained. The nitride fluorescent material obtained by the method according to an embodiment of the present disclosure can be used in a light emitting device as combined with a light emitting element. The light emitting device can be favorably used in light sources for lighting systems, LED displays, backlight sources for liquid crystals, traffic lights, lighting switches, various indicators, small-size strobe and the like where a light emitting diode is used as an excitation light source.

Although the present disclosure has been described with reference to several exemplary embodiments, it shall be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

What is claimed is:

1. A method of producing a nitride fluorescent material, comprising:
preparing a calcined product having a composition that contains at least one first element selected from the group consisting of Ba, Sr, Ca, and Mg, at least one second element selected from the group consisting of Eu, Ce, Tb, and Mn, and Si and N, and
bringing the calcined product into contact with a fluorine-containing substance at a temperature in a range of −20° C. or higher and lower than 150° C.,
wherein the fluorine-containing substance is at least one fluorine-based gas selected from the group consisting of $F_2$, $CHF_3$, $CF_4$, $SiF_4$, and $NF_3$.

2. The method of producing a nitride fluorescent material according to claim 1, wherein the at least one first element includes Ba.

3. The method of producing a nitride fluorescent material according to claim 1, wherein the temperature at which the calcined product is brought into contact with the fluorine-containing substance is at a temperature in a range of 0° C. or higher and lower than 140° C.

4. The method of producing a nitride fluorescent material according to claim 1, wherein the fluorine content in the nitride fluorescent material is in a range of 1% by mass or more and 10% by mass or less.

5. The method of producing a nitride fluorescent material according to claim 1, wherein the calcined product has a composition represented by the following formula (I):

$$(M1_{1-y}M2_y)_2Si_5N_8 \tag{I}$$

wherein M1 represents at least one element selected from the group consisting of Ba, Sr, Ca, and Mg, M2 represents at least one element selected from the group consisting of Eu, Ce, Tb, and Mn, and y is a number satisfying $0.001 \leq y < 0.5$.

6. The method of producing a nitride fluorescent material according to claim 1, wherein the calcined product has a composition represented by the following formula (II):

$$(Ba_{1-x-y}M12_xM2_y)_2Si_5N_8 \tag{II}$$

wherein M12 represents at least one element selected from the group consisting of Sr, Ca and Mg, M2 represents at least one element selected from the group consisting of Eu, Ce, Tb and Mn, and x and y each are numbers satisfying $0.0 \leq x < 1.0$, $0.001 \leq y < 0.5$, and $0.001 \leq x+y < 1.0$.

7. The method of producing a nitride fluorescent material according to claim 1, wherein the calcined product is brought into contact with the fluorine-containing substance in an inert gas atmosphere.

8. The method of producing a nitride fluorescent material according to claim 1, wherein the fluorine-containing substance is fluorine gas.

9. The method of producing a nitride fluorescent material according to claim 1, wherein a reflectance at wavelength 450 nm of the nitride fluorescent material is 12% or less.

10. A method of producing a nitride fluorescent material, comprising:
preparing a calcined product having a composition that contains at least one first element selected from the group consisting of Ba, Sr, Ca, and Mg, at least one second element selected from the group consisting of Eu, Ce, Tb, and Mn, and Si and N, and
bringing the calcined product into contact with a fluorine-containing substance at a temperature in a range of −20° C. or higher and lower than 150° C.,
wherein the calcined product is brought into contact with the fluorine-containing substance in an inert gas atmosphere.

11. The method of producing a nitride fluorescent material according to claim 10, wherein the at least one first element includes Ba.

12. The method of producing a nitride fluorescent material according to claim 10, wherein the temperature at which the calcined product is brought into contact with the fluorine-containing substance is at a temperature in a range of 0° C. or higher and lower than 140° C.

13. The method of producing a nitride fluorescent material according to claim 10, wherein the fluorine content in the nitride fluorescent material is in a range of 1% by mass or more and 10% by mass or less.

14. The method of producing a nitride fluorescent material according to claim 10, wherein the calcined product has a composition represented by the following formula (I):

$$(M1_{1-y}M2_y)_2Si_5N_8 \tag{I}$$

wherein M1 represents at least one element selected from the group consisting of Ba, Sr, Ca, and Mg, M2 represents at least one element selected from the group consisting of Eu, Ce, Tb, and Mn, and y is a number satisfying $0.001 \leq y < 0.5$.

15. The method of producing a nitride fluorescent material according to claim 10, wherein the calcined product has a composition represented by the following formula (II):

$$(Ba_{1-x-y}M12_xM2_y)_2Si_5N_8 \tag{II}$$

wherein M12 represents at least one element selected from the group consisting of Sr, Ca and Mg, M2 represents at least one element selected from the group consisting of Eu, Ce, Tb and Mn, and x and y each are numbers satisfying $0.0 \leq x < 1.0$, $0.001 y \leq 0.5$, and $0.001 \leq x+y < 1.0$.

16. The method of producing a nitride fluorescent material according to claim 10, wherein the fluorine-containing substance is fluorine gas.

17. The method of producing a nitride fluorescent material according to claim 10, wherein a reflectance at wavelength 450 nm of the nitride fluorescent material is 12% or less.

* * * * *